June 27, 1961  B. A. OTTERSTEDT  2,990,464
LIQUID METAL SWITCH
Filed April 21, 1958  2 Sheets-Sheet 2
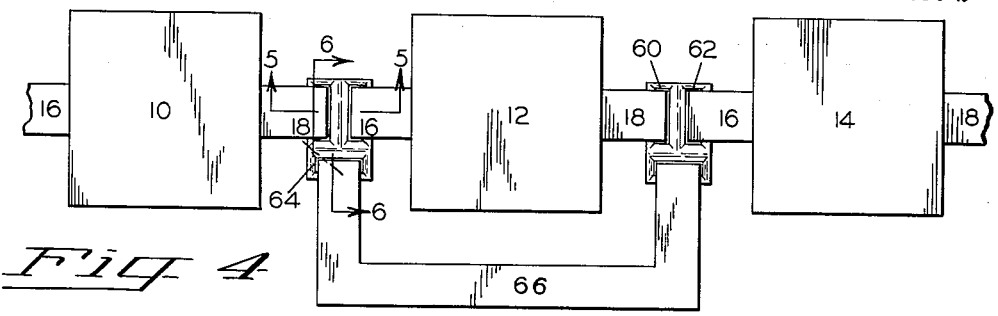
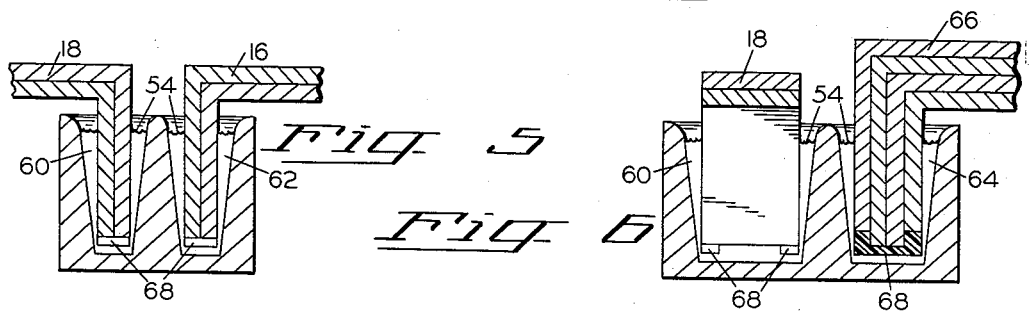
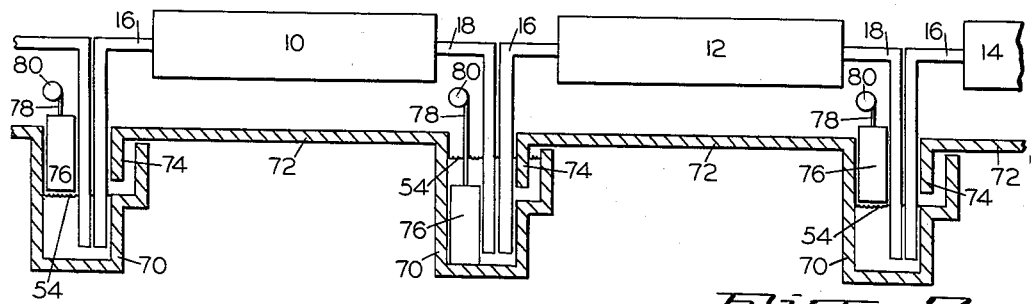
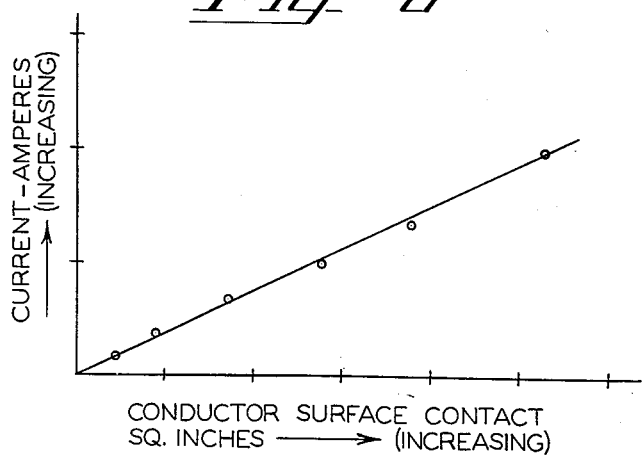
INVENTOR.
BROR A. OTTERSTEDT
BY
F.R.Geisler.
ATTORNEY

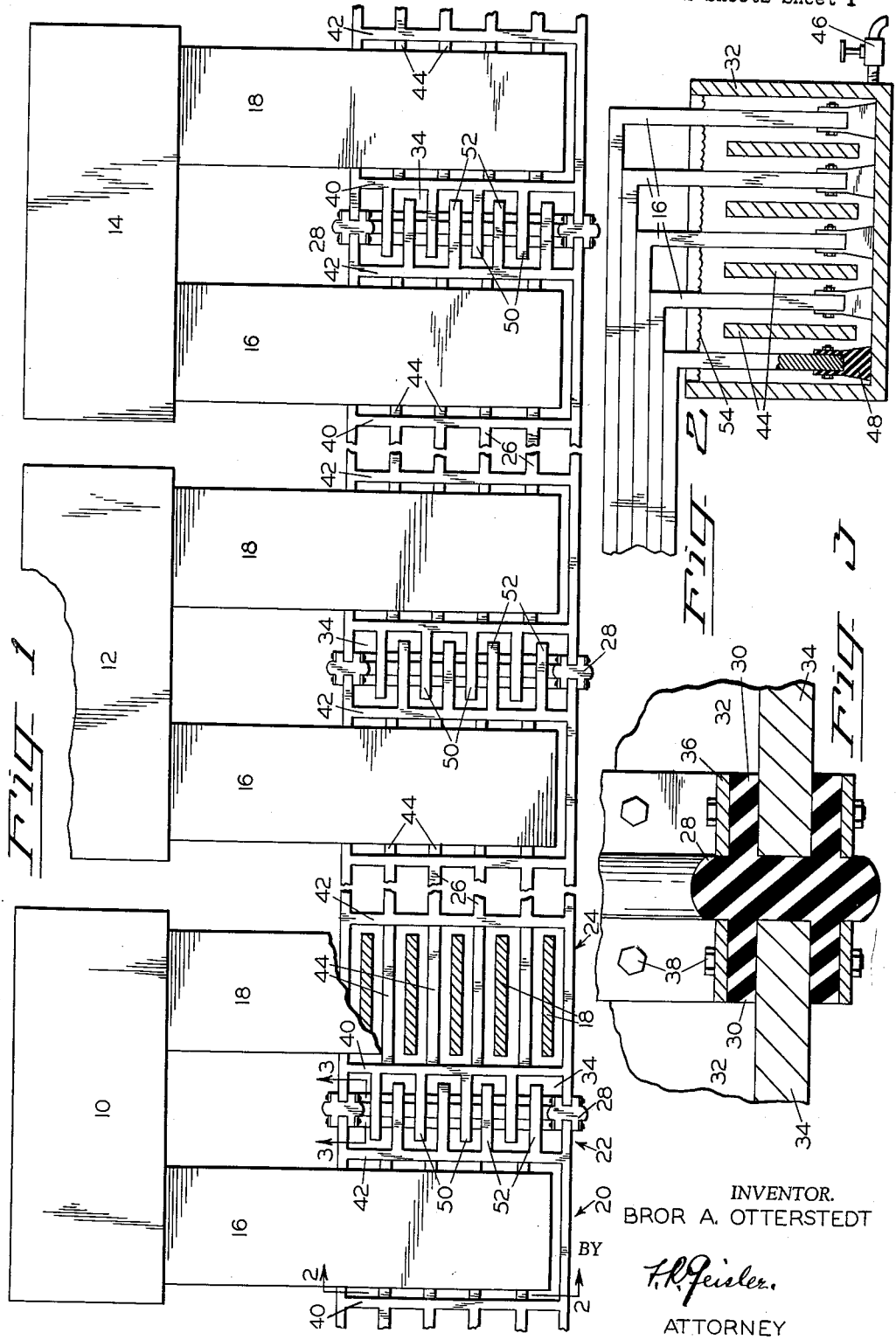

United States Patent Office 2,990,464
Patented June 27, 1961

2,990,464
LIQUID METAL SWITCH
Bror A. Otterstedt, 3535 SW. Spring Garden Road,
Portland, Oreg.
Filed Apr. 21, 1958, Ser. No. 729,691
15 Claims. (Cl. 200—152)

This invention pertains to electric switches, and relates particularly to a liquid metal switch adapted especially for use in electric circuits carrying high currents, for example of the order of from 1,000 to 100,000 amperes.

As an illustration, the electrolytic refining of aluminum generally involves the provision of a plurality of electrolytic cells which form a potline, each cell having a plurality of electrodes and each cell being adapted for removal from the line for maintenance and repair. The cells comprising the potline generally are arranged in a series electrical circuit and are supplied with high current from a common bus bar system which includes mechanical switches by which the individual cells may be removed from and inserted into the potline. When a cell is removed from the line it is necessary to shut down the entire line for the time required to disconnect and remove the cell and to install a jumper connection in the circuit to take the place of the removed cell.

It has been the general experience heretofore that the jumpers and mechanical switches utilized for this purpose present serious disadvantages, among which are the following: First, these mechanical switches involve rather complex structures which require continuous maintenance and repair. Such maintenance and repair require removal of the switches from the system and hence represent a costly interruption of production. Second, mechanical switches draw considerable current during operation and produce substantial arcing during switching, thus not only reducing the operating life of the switch but also incurring excessive waste of electric energy. Third, the installation and removal of an electrolytic cell from a bus bar system involving mechanical switches and jumpers is extremely time consuming since it involves the manual assembly and disassembly of many parts. The time involved in this procedure also represents a serious loss of production time.

Accordingly, it is a principal object of the present invention to provide a switch by which electrolytic cells and the like may be inserted into or removed from a high current circuit with maximum speed and facility, whereby to reduce production down time to a minimum.

Another important object of this invention is to provide a high current switch which is characterized by drawing a minimum of current during operation and which creates a minimum of arcing during switching, whereby to reduce the loss of electric energy to a minimum.

A further important object of this invention is to provide a high current switch which is of extremely simplified construction for economical manufacture, and which has no interconnected moving parts and hence affords long service life with a minimum of maintenance.

The manner in which the above mentioned objects and other advantages are attained with the present invention, and the construction and operation of the novel switch, will be described with reference to the accompanying drawings, wherein:

FIG. 1 is a foreshortened plan view of an electrolytic cell system showing a plurality of cells each having associated therewith a liquid metal switch embodying the features of the present invention, the center switch being shown in the condition for shorting out the associated cell, preliminary to insertion or removal of the latter;

FIG. 2 is a sectional view taken along the line 2—2 in FIG. 1 and showing details of the assembly of one of the switch tanks and associated bus bars, forming a part of the present invention;

FIG. 3 is a sectional view taken along the line 3—3 in FIG. 1 and showing details of construction of the insulating joint between adjacent sections of the center switch tank;

FIG. 4 is a plan view of an electrolytic cell system showing a plurality of cells having associated therewith a modified form of liquid metal switch embodying the features of the present invention;

FIG. 5 is a sectional view taken along the line 5—5 in FIG. 4, drawn to a larger scale;

FIG. 6 is a sectional view taken along the line 6—6 in FIG. 4;

FIG. 7 is a sectional view in side elevation of a further modified form of liquid metal switch embodying the features of the present invention; and FIG. 8 is a graphic representation illustrating the relationship between electric current conduction through an electrode as the surface contact of the latter with a liquid metal is varied.

Referring first to FIG. 1 of the drawings, there is shown a plurality of electrolytic cells 10, 12 and 14 each provided with a plurality of pairs of electrodes. Each electrode of a pair is connected to a bus bar 16, 18 for connection to a high current source of electric energy.

In the embodiment illustrated in FIGS. 1, 2 and 3, the supply of high current is fed to the cells through a plurality of series-connected switches, each of which comprises a plurality of tanks 20, 22 and 24 adapted to contain electrically conductive liquid metal. In the preferred construction of the switch the tank 20 and one portion of the center tank 22 are cast as an integral unit, preferably of aluminum. Similarly, the tank 24 and the other portion of the center tank 22 are cast as an integral unit. If desired, one section of each of two adjacent switches may be connected together as a unit by means of the integrally cast aluminum bus bars 26. Thus, as illustrated, tank 20 of one switch and tank 24 of the adjacent switch are connected together integrally with the bus bars 26. The central tank 22 of each switch is completed by interconnecting the halves with an electrical insulating joint. In the embodiment illustrated this joint is provided in the form of an elongated strip 28 of insulating material, such as rubber or synthetic thermoplastic, provided with longitudinal grooves 30 in its side edges for receiving therein the spaced adjacent edges of the outer walls 32 and bottom 34 of the center tank. The insulating strip is secured to the spaced sections of the tanks by means of the elongated backing plates 36 and the longitudinally spaced bolts 38, as indicated in FIG. 3.

Supported between the longitudinally spaced walls 40 and 42 of each of the end tanks 20 and 24 and extending parallel to the side walls 32, are a plurality of laterally spaced dividers 44, preferably cast integrally with the tanks. The dividers terminate a spaced distance from the bottom 34 of the tank, to permit the flow of liquid metal under the dividers when filling or emptying the tank. Emptying the tank is effected conventionally by means of a spigot 46. Thus, the tank is divided into a plurality of compartments, each of which is adapted to removably receive a bus bar 16 or 18. In the preferred construction of the bus bar, as shown in FIG. 2, a block of electrical insulation material 48 is secured to the terminal end of each bar to provide a guide therefor during passage between the dividers during installation and removal. The block also provides a base support for the bar upon the bottom of the tank and positions the bus bars in spaced relation.

The central tank 22 of the switch is similarly provided with longitudinally extending dividers, preferably cast integrally with the associated supporting wall. The dividers of the central tank do not interconnect the opposite lateral walls thereof, but rather terminate a spaced distance therefrom. Thus, as best shown in FIG. 1, the dividers 50 projecting from the wall 40 terminate a spaced distance from the opposite wall 42 and from the bottom 34 of the tank, while the dividers 52 projecting from the wall 42 are arranged to interleaf with the first mentioned dividers 50 and to terminate a spaced distance from the wall 40 and bottom 34.

The operation of the switch described hereinbefore and shown in FIGS. 1, 2 and 3 is as follows: Let it first be assumed that it is desired to operate all three of the cells 10, 12 and 14 illustrated. Accordingly, the end tanks 20 and 24 of each switch are filled with an electrically conductive liquid metal 54, and the central tank 22 is kept empty. In this manner the series electric is completed through all of the cells since the insulating joint 28 in the central tank isolates the end tanks of each switch from each other.

Let it now be assumed that it is desired to remove the central cell 12 from the line and that the end cells 10 and 14 are to remain in operation. Accordingly, the central tank 22 is filled with liquid metal and, if desired, liquid metal is removed from the end tanks 20 and 24 of the switch associated with the central cell 12. Thus, it will be seen that if the liquid metal is removed from tanks 20 and 24 of the central switch, the electric circuit from the source of high current is completed through the tank 20 of the first switch, the bus bars 16, the electrolytic cell 10, the bus bars 18 and the tank 24 of the first switch, through the connecting bus bars 26 and the dividers 44 of the empty tank 20 of the second switch, through the liquid metal contained in the central tank 22 to the dividers 44 in the empty tank 24 of the second switch, thence through the liquid metal in the tank 20 of the third switch, through the bus bars 16 to the electrolytic cell 14, and thence through the bus bars 18 and the liquid metal in the tank 24 of the third switch to the bus bars 26 connected either to subsequent cells or to the opposite side of the electric supply.

Since the liquid metal in the central tank 22 provides electric conductivity across the insulating joint 28, and since the bus bars 16 and 18 in the empty tanks are disconnected electrically from the latter, the central cell 12 is effectively disconnected from the circuit and may be worked upon without further manipulation. Alternatively, the entire cell may be removed with maximum facility and speed, simply by removing the bus bars 16 and 18 from the end tanks of the central switch. In the event the liquid metal is retained in the end tanks of the central switch, it will be understood that the central cell 12 will be effectively shorted by the central switch.

Referring now to FIGS. 4, 5 and 6 of the drawings, there is shown a modified form of liquid metal switch for use in interconnecting a plurality of electrolytic cells 10, 12 and 14. In this embodiment the switch comprises a compartmented container, preferably cast as an integral unit, and providing the pair of adjacent side compartments proportioned to receive the bus bars 16, 18 connected to the electrodes of adjacent cells, and the end compartment 64 is adapted to receive one end of a shunting bus bar 66, the purpose of which is explained more fully hereinafter. The terminal ends of the associated bus bars preferably are provided with electrically non-conducting guide blocks 68, as illustrated, in the manner and for the purpose of the blocks 48 described hereinbefore. The compartments of the switch are adapted to contain an electrically conductive liquid metal, in the manner of the tanks previously described.

In use, the switch compartments are filled with an electrically conductive liquid metal 54 and placed in between adjacent electrolytic cells. The bus bars 16, 18 are inserted into the adjacent side compartments 60 and 62, whereby to serially interconnect the plurality of cells. In the vent it is decided to remove a cell from the line, the opposite ends of a shunting bus bar 66 are inserted into the end compartments 64 of the switches flanking the cell to be removed, thereby shorting out the latter. The cell then may be removed simply by extracting the electrode bus bars from the side compartments 60, 62 of the flanking switches.

Referring now to FIG. 7 of the drawings, there is shown a still further modified form of liquid metal switch for interconnecting a plurality of electrolytic cells. Each switch includes a container 70 of electrically conductive material adapted to contain an electrically conductive liquid metal 54. Connected to one wall of the container and extending laterally outward therefrom is a bus bar 72, the opposite end 74 of which is offset downwardly for projecting into the container 70 of the adjacent switch. The container of each switch is adapted to receive therein the free end of one or more bus bars 16, 18 which are connected to the electrodes of the electrolytic cells. The bus bars are adapted to be spaced electrically from the downturned end 74 of the bus bar of the adjacent switch and to project into the container a distance greater than said downturned end. Also associated with each container is a plunger 76 of considerable mass and of greater density than the liquid metal. The plunger may be connected to a cable 78 which is anchored to a winch mechanism 80 which functions to lower and elevate the plunger. The winch mechanism may be powered manually or by electric, hydraulic or pneumatic motors. Further, these motors may be controlled automatically by various types of actuators which are sensitive to variation in physical or chemical conditions occurring in the cells.

The operation of the switch shown in FIG. 7 is as follows: A plurality of the switches are arranged with their containers 70 flanking the opposite ends of a plurality of cells, and the bus bars 16, 18 connected to the electrodes of the cells are inserted into the containers to a depth at which they are immersed in the liquid metal 54 when the plunger 76 is in the elevated position. In this position of elevation, the level of the liquid metal in each container is below the lower end of the downturned end 74 of the bus bar 72 connected to the adjacent container, as illustrated by the end container. By this arrangement the series circuit supply is completed through each of the electrolytic cells, as will be apparent.

If it is desired to remove a cell, for example the central cell 12, from the series circuit, the plunger 76 associated with the central switch is lowered into the container 70, thereby elevating the level of liquid metal so that the downturned end 74 of the bus bar 72 is immersed in the liquid metal. Thus, the bus bar 72 effectively shunts the central electrolytic cell 12, permitting its removal from the circuit simply by elevating it and the connected bars from the switch container.

In a modified arrangement of the embodiment illustrated in FIG. 7, each cell 10, 12 and 14 may constitute its own associated electrode 18, and thus may be supported upon and in electrical contact with the associated underlying bus bar 72. The mode of operation is the same in either instance.

It will be understood that the plunger system employed in the embodiment of FIG. 7 also may be used in the embodiments previously described, for selectively varying the level of liquid metal in the tanks and thus effecting immersion or removal of the bus bars in or from the liquid metal.

In each of the embodiments illustrated and described hereinbefore an electrically conductive liquid metal is employed as a component part of the switch. It will be understood that any electrically conductive metal or mixtures thereof, capable of being maintained in a liquid state, may be used for this purpose. It is most desirable to use a metal which remains liquid at relatively low temperature. Although mercury may be employed, the precautions necessary to avoid its toxic effects render its use less desirable than other metals. Among metals and metal mixtures more suitable for this purpose is a mixture having the approximate composition of about 50 parts bismuth, 25 parts lead, 13 parts cadmium and 12 parts tin, the parts being in parts by weight. This mixture is characterized by having a melting point of 158° F. Although this melting point is somewhat above normal atmospheric temperature, it has been found that once it has been liquified by the simple procedure of heating in the compartments of the switch, sufficient heat is generated during normal operation of the electrolytic cells to maintain the metal in its liquid state. Other metals and combinations thereof may be employed, and some of these may require the use of an external source of heat to maintain the metal in a liquid state.

It has been determined that a substantial reduction in current loss at the switch is achieved with the liquid metal switch of this invention as compared with conventional mechanical switches employed in high current circuits. Moreover, a substantial reduction in arcing is achieved with the liquid metal switch during insertion and removal of the bus bars by virtue of the gradual increase or decrease in bus bar contact with the liquid metal. This is demonstrated by the graphic plot of FIG. 8 which was prepared by connecting one side of a 200 ampere electric circuit to liquid metal in a container and the opposite side of the electric circuit to an elongated carbon conductor, which was tapered to a point, and measuring the variations in current as the conductor was immersed to varying depths into the liquid metal. The plot shows that current conduction varies in proportion to the surface area of the conductor immersed in the liquid metal. The slope of the line varies with the magnitude of the total current and with the conductivity of the conductor. Thus, the switch of the present invention affords current conduction with minimum loss during normal operation of the electric circuit, and also affords substantial reduction of current during opening and closing of the switch, thereby reducing arcing to a practical minimum.

Various modifications may be made in the construction which I have illustrated and described, without departing from the principle of my invention, and it is not my intention to restrict my invention otherwise than as set forth in the appended claims.

I claim:

1. A liquid metal switch for use in electric circuits carrying currents in excess of about 1000 amperes, comprising electrically conductive substantially nontoxic metal alloy characterized by being solid at normal atmospheric conditions and capable of being maintained in a liquid state, an electric conductor, means connecting the liquid metal alloy and the electric conductor in series in an electric circuit, and means supporting the liquid metal alloy and electric conductor for movement relative to each other for removably immersing the conductor in the liquid metal alloy.

2. A liquid metal electric switch adapted selectively to connect an electric load in series in an electric circuit and to shunt said load, the switch comprising a pair of containers separated electrically from each other and each removably containing electrically conductive metal in a liquid state, electrical conductor means connecting the liquid metal in the pair of containers to a source of electric energy, the pair of containers being arranged to removably receive into the liquid metal contained therein the terminal conductors of an electric load, whereby said load directly bridges the liquid metal in the pair of containers, removable electrically conductive shunting means adapted to directly bridge the liquid metal in the pair of containers for selectively shunting said load, whereby to permit connection and disconnection of the load without breaking the electric circuit, and means for moving the liquid metal and shunting means relative to each other for varying the depth of immersion of the shunting means in the liquid metal for varying the amount of current bypassed from the load.

3. The switch of claim 2 wherein the pair of containers are composed of electrically conductive material and the shunting means comprises electrical conductor means connected at one end to one of the pair of spaced containers, the opposite end of the conductor means being receivable within and spaced electrically from the second of the pair of spaced containers for removable engagement with the liquid metal contained in the latter.

4. The switch of claim 2 wherein the shunting means comprises electrical conductor means connected at one end to the liquid metal in one of the pair of spaced containers, the opposite end of the conductor means being receivable within and spaced electrically from the second of the pair of spaced containers for removable engagement with the liquid metal contained in the latter.

5. A liquid metal switch comprising electrically conductive metal alloy capable of being maintained in a liquid state and being composed in approximate parts by weight of 50 parts bismuth, 25 parts lead, 13 parts cadmium and 12 parts tin, an electric conductor, means connecting the liquid metal alloy and the electric conductor in series in an electric circuit, and means supporting the liquid metal alloy and the electric conductor for movement relative to each other for removably immersing the conductor in the liquid metal alloy.

6. A liquid metal electric switch adapted to releasably shunt an electric load and comprising a pair of electrically conductive containers separated electrically from each other and each removably containing electrically conductive metal in a liquid state, the liquid metal being an alloy composed in approximate parts by weight of 50 parts bismuth, 25 parts lead, 13 parts cadmium and 12 parts tin, the pair of containers being adapted for connection to a source of electric energy and being proportioned to removably receive into the liquid metal contained therein the terminal conductors of an electric load, and electrically conductive shunt connector means removably interconnecting the pair of containers for selectively shunting the said electric load.

7. A liquid metal electric switch adapted to releasably shunt an electric load and comprising a pair of electrically conductive containers separated electrically from each other and each including three compartments for containing electrically conductive metal in a liquid state, one compartment of each container being proportioned to removably receive into the liquid metal contained therein a terminal conductor of a source of electric energy, a second compartment of each container being adapted to removably receive into the liquid metal contained therein a terminal conductor of an electric load for series connection to the source of electric energy, the third compartment of each container being adapted to removably receive into the liquid metal contained therein one end of an electrically conductive shunt connector for selectively shunting the said electric load, and electrically conductive shunt connector means removably interconnecting the third compartments of the pair of containers for selectively shunting the said electric load.

8. A liquid metal electric switch adapted to releasably shunt an electric load and comprising a pair of containers separated electrically from each other and each including three compartments for containing electrically conductive metal in a liquid state, one compartment of each container being proportioned to removably receive into the liquid metal contained therein a terminal conductor of a source of electric energy, a second compartment of each container being adapted to removably receive into the liquid metal contained therein a terminal conductor of an electric load for series connection to the source of electric energy, the third compartment of each container being adapted to removably receive into the liquid metal contained therein one end of an electrically conductive shunt connector for selectively shunting the said electric load, electrically conductive shunt connector means removably interconnecting the third compartments of the pair of containers for selectively shunting the said electric load, and electrically conductive means interconnecting the electrically conductive liquid metal in the three compartments of each container.

9. A liquid metal electric switch adapted selectively to connect an electric load in series in an electric circuit and to shunt said load, the switch comprising a pair of electrically conductive containers separated electrically from each other and each removably containing electrically conductive metal in a liquid state, electrical conductor means connecting the liquid metal in the pair of containers to a source of electric energy, the pair of containers being arranged to removably receive into the liquid metal contained therein the terminal conductors of an electric load, and shunting means comprising an intermediate electrically conductive container including a pair of electrically separated container sections one connected electrically to each of the pair of containers, and electrically nonconducting connector means interconnecting said separated sections, the intermediate container being adapted to removably contain electrically conductive metal in a liquid state for selectively bridging the electrically non-conducting connector means.

10. A liquid metal electric switch adapted selectively to connect an electric load in series in an electric circuit and to shunt said load, the switch comprising a pair of electrically conductive containers separated electrically from each other and each removably containing electrically conductive metal in a liquid state, electric conductor means connecting the liquid metal in the pair of containers to a source of electric energy, the pair of containers being arranged to removably receive into the liquid metal contained therein the terminal conductors of an electric load, and shunting means comprising electrical conductor means connected at one end to one of the pair of spaced containers, the opposite end of the conductor means being receivable in and spaced electrically from the second of the pair of spaced containers for removable engagement with the liquid metal contained in the latter, and plunger means arranged for removable reception within said second container for varying the level of liquid metal therein between a lowered position out of engagement with the said opposite end of the conductor means and an elevated position engaging said opposite end of the conductor means.

11. A liquid metal electric switch adapted selectively to connect an electric load in series in an electric circuit and to shunt said load, the switch comprising a pair of containers separated electrically from each other and each removably containing electrically conductive metal in a liquid state, electrical conductor means connecting the liquid metal in the pair of containers to a source of electric energy, the pair of containers being arranged to removably receive into the liquid metal contained therein the terminal conductors of an electric load, and shunting means comprising an intermediate container including a pair of electrically separated electrically conductive container sections one connected electrically to the liquid metal in each of the pair of containers, and electrically non-conducting connector means interconnecting said separated sections, the intermediate container being adapted to removably contain electrically conductive metal in a liquid state for selectively bridging the electrically non-conducting connector means.

12. A liquid metal electric switch adapted selectively to connect an electric load in series in an electric circuit and to shunt said load, the switch comprising a pair of containers separated electrically from each other and each removably containing electrically conductive metal in a liquid state, electrical conductor means connecting the liquid metal in the pair of containers to a source of electric energy, the pair of containers being arranged to removably receive into the liquid metal contained therein the terminal conductors of an electric load, and shunting means comprising electrical conductor means connected at one end to the liquid metal in one of the pair of spaced containers, the opposite end of the conductor means being receivable within the second of the pair of spaced containers for removable engagement with the liquid metal contained in the latter, and plunger means arranged for removable reception within said second container for varying the level of liquid metal therein between a lowered position out of engagement with the said opposite end of the conductor means and an elevated position engaging said opposite end of the conductor means.

13. A liquid metal electric switch adapted selectively to connect an electric load in series in an electric circuit and to shunt said load, the switch comprising a pair of containers separated electrically from each other and each removably containing electrically conductive metal alloy capable of being maintained in a liquid state and being composed in approximate parts by weight of 50 parts bismuth, 25 parts lead, 13 parts cadmium and 12 parts tin, electrical conductor means connecting the liquid metal alloy in the pair of containers to a source of electric energy, the pair of containers being arranged to removably receive into the liquid metal alloy contained therein the terminal conductors of an electric load, and electrically conductive shunting means removably interconnecting the liquid metal in the pair of containers for selectively shunting said load.

14. A liquid metal electric switch adapted selectively to connect an electric load in series in an electric circuit and to shunt said load, the switch comprising a pair of containers separated electrically from each other and each including three compartments for containing electrically conductive metal in a liquid state, one compartment of each container being proportioned to removably receive into the liquid metal contained therein a terminal conductor of a source of electric energy, a second compartment of each container being adapted to removably receive into the liquid metal contained therein the terminal conductor of an electric load for series connection to the source of electric energy, and the third compartment of each container being adapted to removably receive into the liquid metal contained therein one end of an electrically conductive shunt connector for selectively shunting the said electric load.

15. A liquid metal electric switch adapted selectively to connect an electric load in series in an electric circuit and to shunt said load, the switch comprising a pair of containers separated electrically from each other and each including three compartments for containing electrically conductive metal in a liquid state, one compartment of each container being proportioned to removably receive into the liquid metal contained therein a terminal conductor of a source of electric energy, a second compartment of each container being adapted to removably receive into the liquid metal contained therein the terminal conductor of an electric load for series connection to the source of electric energy, and the third compartment of each container being adapted to removably receive into the liquid metal contained therein one end of an electrically conductive shunt connector for selectively shunting the said electric load, and electrically conductive means interconnecting the electrically conductive liquid metal in the three compartments of each container.

References Cited in the file of this patent

UNITED STATES PATENTS

| | | |
|---|---|---|
| 519,715 | Keller | May 15, 1894 |
| 623,511 | Bouchet | Apr. 25, 1899 |
| 683,213 | Mansfield et al. | Sept. 24, 1901 |